G. J. CARPENTER.
Corn-Planters.

No. 140,114.

2 Sheets--Sheet 2.

Patented June 24, 1873.

ATTEST:
H. F. Eberts.
S. J. Sprague

INVENTOR:
George J. Carpenter,
per Attorney
Thos. S. Sprague

UNITED STATES PATENT OFFICE.

GEORGE J. CARPENTER, OF ADRIAN, MICHIGAN.

IMPROVEMENT IN CORN-PLANTERS.

Specification forming part of Letters Patent No. 140,114, dated June 24, 1873; application filed February 18, 1873.

*To all whom it may concern:*

Be it known that I, GEORGE J. CARPENTER, of Adrian, in the county of Lenawee and State of Michigan, have invented a new and useful Improvement in Corn-Planters; and I do declare that the following is a true and accurate description thereof, reference being had to the accompanying drawings and to the letters of reference marked thereon, and being a part of this specification, in which—

Figure 1:
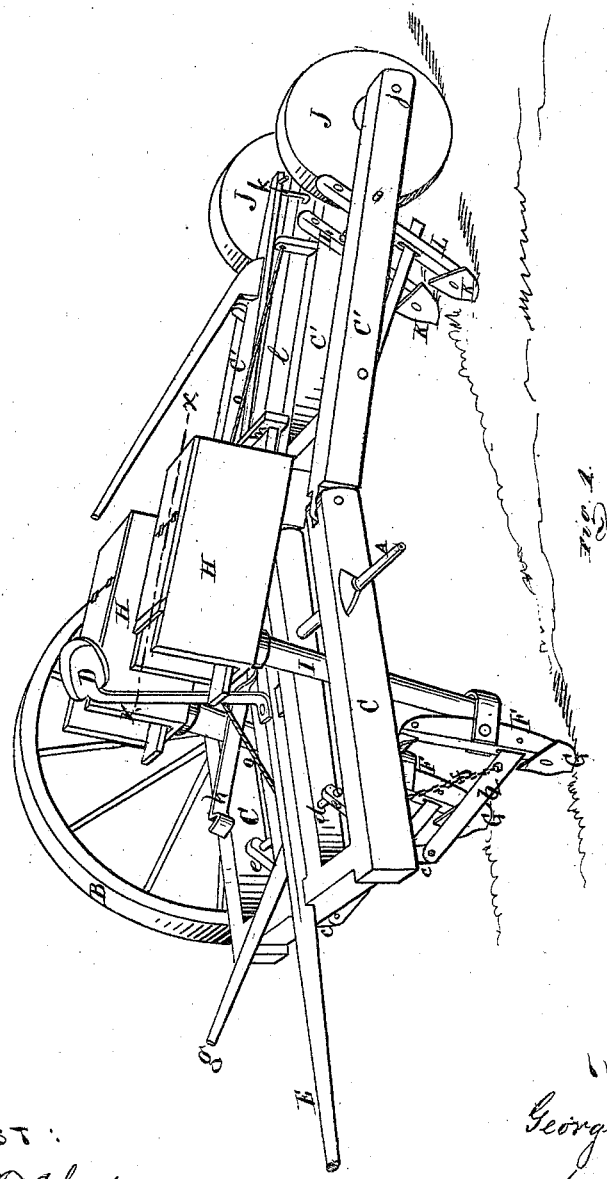
Figure 2:
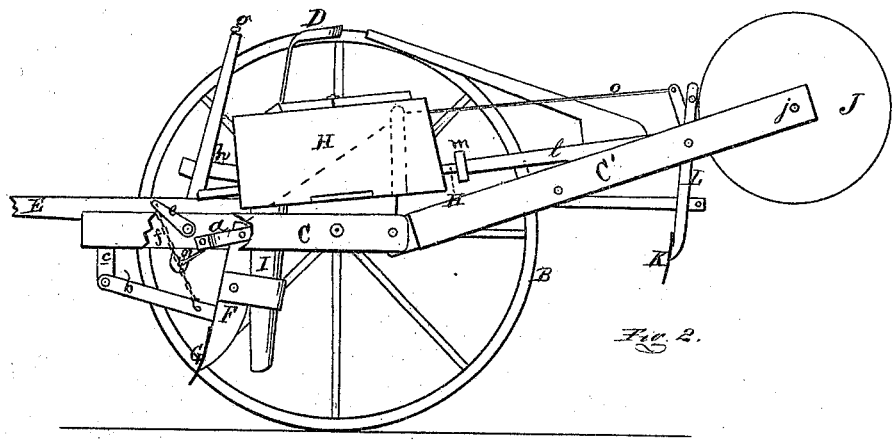
Figure 3:
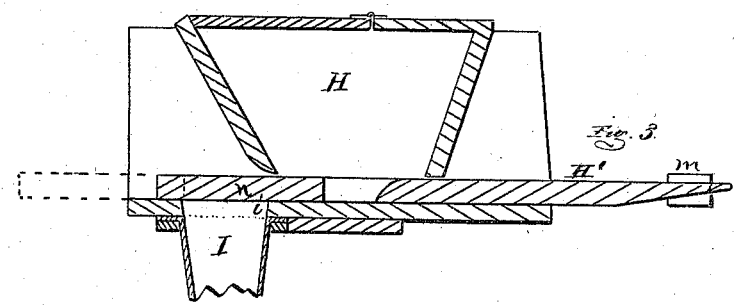
Figure 4:
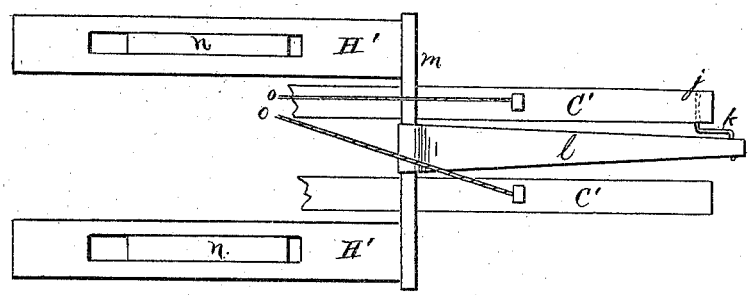

Figure 1, Sheet 1, is a perspective view of my corn-planter as seen in operation with the rear traction-wheel removed. Fig. 2, Sheet 2, is a side elevation, showing the furrow-openers and covering devices raised from the ground. Fig. 3 is a longitudinal vertical section through a seed-box on $x\ x$ in Fig. 1. Fig. 4 is a plan of a dropper-slide.

Like letters refer to like parts in the several figures.

The invention consists, first, in the peculiar arrangement of the furrow-opening shovels with relation to the main frame; and, second, in the combination of a rock-shaft and its connections with the furrow-openers of the main frame and the hinged rear frame, as will be described hereinafter.

In the drawing, A represents an axle, on each arm of which a traction-wheel, B, is mounted. C is the main frame-work mounted on the axle, and is provided with a seat, D, for the driver, and a tongue or pole, E. F F are standards. To the lower end of each is attached a double shovel, G, for opening the furrows. The top of each standard is pivoted to the rear ends of a pair of bars, $a$, whose front ends are in turn pivoted to the longitudinal sills of the main frame. $b$ is a radius-rod having one end pivoted in the lower part of each standard and the other to a hanger, $c$, pendent from the main frame. $d$ is a rock-shaft journaled across the fore part of frame A with an arm, $e$, at each end, from the end of which the standard below is suspended by a cord, $f$, attached to the radius-rod. $g$ is a hand-lever secured to the rock-shaft, which passes through it near the lower end, and when swung back raises the furrow-openers, being held by a spring-stop, $h$, as seen in Fig. 2. H H are two seed-hoppers mounted on the main frame, each having a spout, I, leading from an opening, $i$, in the front part of the bottom to the rear part of the standard. C' C' are two frames hinged to the rear end of the main frame, each having the shaft $j$ of a roller, J, journaled in its rear end, the inner end of one shaft having attached to it a crank, $k$, to whose wrist is pivoted a connecting-rod, $l$, whose front end is strapped to a cross-head, $m$, to each end of which is attached a dropper-slide, H', which plays through the seed-hopper H. This slide is provided with a longitudinal slot, in which is placed an adjustable block, $n$, as shown in Fig. 4, by means of which the opening in the front end of the slot may be increased or diminished at will. The reciprocation of the slides is effected by means of the crank $k$ of the roller-shaft, as shown in Figs. 3 and 4. The opening $i$ in the bottom board of the seed-hopper is outside of its front wall, so that when the throat or opening of the dropper-slide is in the hopper it fills with seed, which is carried forward with the slide until over the opening $i$, when it drops through into the spout I, which conducts it to the furrow. K K are two shovels, each secured to standards L L, with an inward bevel or inclination toward the furrow. The standards are adjustably secured to the longitudinal frame-bars in advance of the rollers, one at each side thereof, so that the shovels will throw the earth back into the furrow, while the roller will pack it down over the seed. To raise the frames C' C' and their attachments clear of the ground, when it is desired to move the machine without having it operate, I attach two cords, $o\ o$, to short posts on each frame-section, and lead them forward through a guide-standard to the short or lower arm of the lever $g$ of the rock-shaft $d$, so that when the driver draws back said lever he raises the rear frames as well as the furrow-openers.

What I claim as my invention is—

1. The combination of the standards F carrying the shovels G, the bars $a$, and the radius-rods $b$, with relation to the frame C, rock-shaft $d$, arms $e$, cords $f$, and lever $g$, as and for the purpose set forth.

2. The combination of lever $g$, rock-shaft $d$, and cords $o\ o$ and $f\ f$ with the standards of the furrow-openers of the main frame, and the hinged frame C' carrying the shovels K K, as and for the purpose set forth.

GEORGE J. CARPENTER.

Witnesses:
H. F. EBERTS,
H. S. SPRAGUE.